United States Patent Office 3,423,971
Patented Jan. 28, 1969

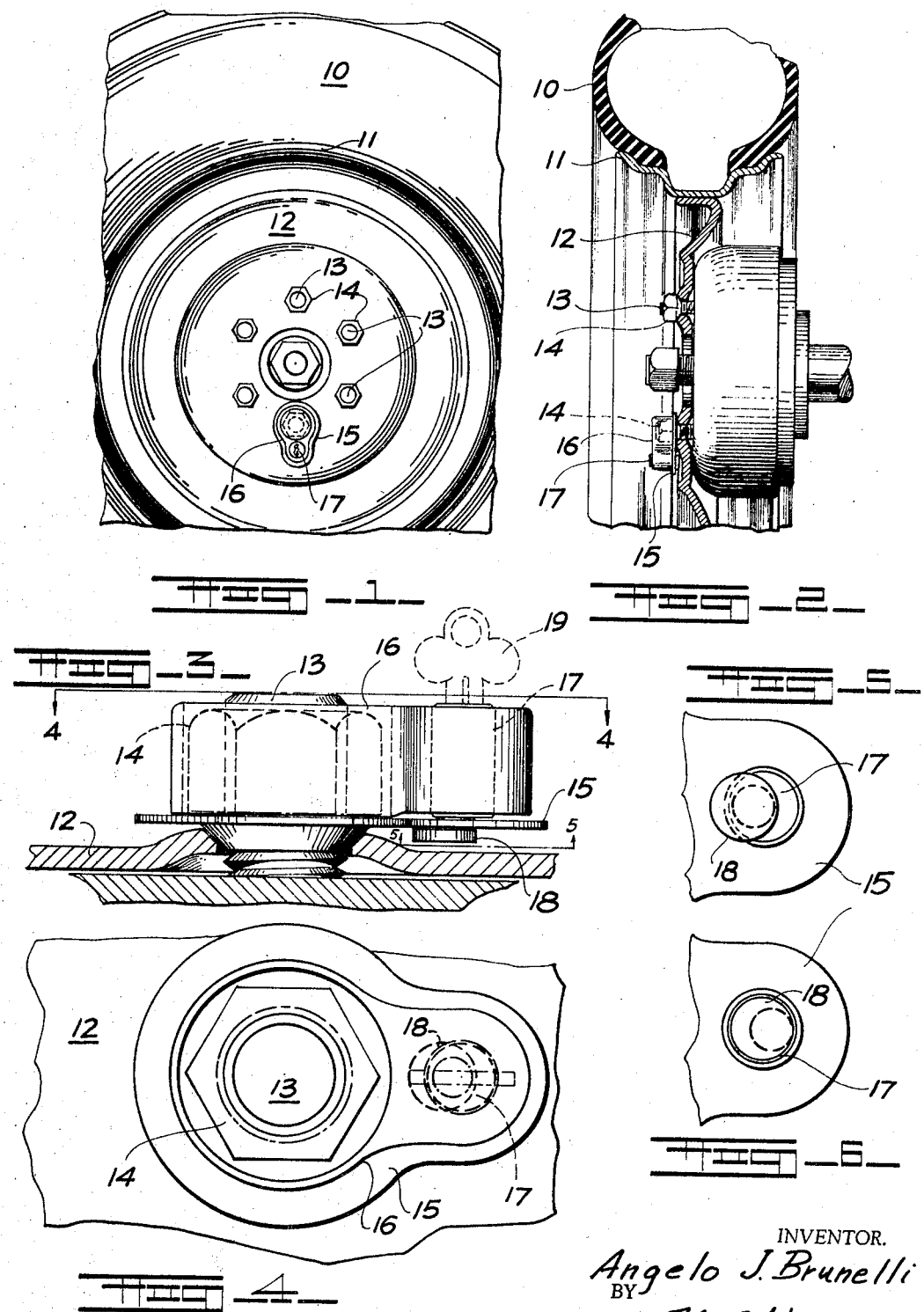

3,423,971
AUTOMOBILE WHEEL LOCK
Angelo J. Brunelli, 128 Phillips Ave., Niles, Ohio 44446
Filed June 2, 1967, Ser. No. 643,114
U.S. Cl. 70—231    2 Claims
Int. Cl. F16b *41/00;* F16k *35/10;* E05b *65/12*

ABSTRACT OF THE DISCLOSURE

An automobile wheel lock for securing wheel lug nuts to a wheel to prevent the removal thereof, and including a sleeve encircling said wheel lug nut and an integral lock device.

---

The principal object of the invention is the provision of an automobile wheel lock of a simple, inexpensive form that prevents the removal of a wheel lug nut and therefore the removal of the wheel so equipped.

A further object of the invention is the provision of an automobile wheel lock that is easy to manufacture and which may be sold at a relatively low cost and is simply and easily applied to an automobile wheel by removing one of the lug nuts normally holding the wheel in place on the automobile, and securing the lock thereto.

A still further object of the invention is the provision of an automobile wheel lock which when installed makes it impossible to apply a wrench to one of the wheel lug nuts and thereby prevents removal of the wheel protected by the lock.

The automobile wheel lock disclosed herein comprises an improvement in the art relating to such devices, and specifically in the simplicity and direct application of the device. Wheel locks heretofore known in the past have been relatively large and heavy and have required counter-balancing measures to avoid imbalance in the wheel so equipped. Additionally, such prior art devices have attempted to enclose a wheel lug nut and secure the enclosure against unauthorized entry. Such devices are relatively easy to open by force, and are therefore generally ineffective for the intended purpose. The present invention provides a simple sleeve and lock combination, the sleeve circling one of the lug nuts holding the automobile wheel in place, with the lock portion engaging an apertured plate in a cam-like action, which plate is secured to the wheel by the protected lug nut. Thus, the nut cannot be removed due to the presence of the sleeve, and the sleeve cannot be removed until the lock is released from the plate held by the nut.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side view of an automobile wheel and tire in position on an automobile, and showing the lock thereon. Parts of the automobile are broken away.

FIGURE 2 is a vertical section through a portion of an automobile wheel tire and brake drum assembly showing the wheel lock in place.

FIGURE 3 is an enlarged detailed side elevation of the wheel lock with parts of the automobile wheel in cross-section.

FIGURE 4 is a top plan view on line 4—4 of FIGURE 3.

FIGURE 5 is a bottom elevation on line 5—5 of FIGURE 3.

FIGURE 6 is an elevation similar to FIGURE 5 and showing an alternate positioning of the eccentric lock.

By referring to the drawing, and FIGURE 1 in particular, it will be seen that a portion of an automobile wheel and pneumatic tire assembly has been shown with the tire shown with portions broken away and indicated by the numeral 10, the rim of the wheel indicated by the numeral 11, and the wheel itself indicated by the numeral 12. The wheel is secured to the brake drum and axle structure of the automobile, as will be understood by those skilled in the art, by a plurality of lugs 13 formed on the brake drum and axle structure and extending perpendicularly to the wheel and registering with circumferentially spaced openings therein. Lug nuts 14 are positioned one on each of the lugs 13 and these nuts 14 are tapered so that they will engage the circumferentially spaced openings in the wheel and thereby hold the wheel in proper centered location relative to the lug nuts.

In order that the wheel be removed from the automobile it is necessary that the lug nuts 14 be removed. In order that the wheel not be removed by an unauthorized person, as in the case of car stripping and the like, the automobile wheel lock disclosed herein is used and hereinafter described.

In FIGURES 1 and 2 of the drawing, the wheel lock will be seen to comprise an apertured plate 15 and a nut encircling sleeve and lock unit 16, the sleeve portion of which is annular and of a size fitting snugly over the lug nut 14 so that a wrench cannot be positioned thereon. The lock portion of the unit 16 includes a cylinder lock 17 and an axially extending rotatable cam element 18. The apertured plate 15 includes a pair of apertures, one of which is slightly larger than the size of the lug 13 and the other of which is slightly larger than the cam member 18. The spacing of the apertures in the plate 15 is such that when the plate is positioned on the lug 13 as shown, for example, in FIGURES 3 and 4 of the drawing, the cam member 18 must be turned by the cylinder lock 17 which in turn is moved by a key 19 to a position where the cam member 18 will move through the smaller aperture in the plate 15. When this occurs the sleeve and lock unit 16 must be in position on the lug nut 14, and upon further rotation of the cylinder lock 17 by the key 19 the cam member 18 will revolve so that its eccentric positioning will move it out of registry with the smaller aperture through which it was positioned, and it will therefore be impossible to remove the sleeve and lock unit 16 until the cam unit 18 is again revolved by the cylinder lock 17. It will thus be seen that the lock is simple and efficient, that the apertured plate 15 is an essential part of it, as it is held to the wheel by the lug nut 14, and the sleeve portion of the sleeve and lock unit 16 then prevents the removal of the nut 14 as long as the sleeve and lock combination unit 16 is in position and locked to the plate 15.

As will be seen by referring to FIGURES 5 and 6 of the drawing, the cam portion 18 of the lock is located off-center with respect to the axis of the cylinder lock 17 and so that it will rotate from said off-center position to an in-line position with respect to the cylinder lock 17, in which position it will register freely with the opening in the apertured plate 15.

It will thus be seen that a simple and efficient automobile wheel lock has been disclosed which meets the several objects of the invention, and having thus described my invention, what I claim is:

1. An automobile wheel lock for preventing the removal of a wheel from an automobile axle, including wheel lugs normally registering with circumferentially spaced openings in said wheel, and lug nuts normally holding said wheel on said lugs, and comprising a flat plate having spaced circular openings therein positioned with one of said openings on one of said lugs and held by one of said lug nuts, a sleeve and lock unit, the sleeve portion of which comprises an annular member surrounding said lug nuts and the lock portion of which includes a projecting eccentric member rotatable from a position in line with said lock to a position off-center with respect thereto, and registerable with the other one of the openings in said flat plate when in said in-line position, said sleeve portion acting to prevent access to said lug nut as necessary for its removal in removing said wheel.

2. The automobile wheel lock set forth in claim 1 and wherein said circular openings are located in said flat plate with their centers lying on the axial center lines of the sleeve portion and the lock portion respectively, of said sleeve and lock unit.

References Cited

UNITED STATES PATENTS 1,912,872 6/1933 Trautner _____ 70—260
2,322,347 6/1943 Churchman _____ 70—232

FOREIGN PATENTS 927,017 4/1947 France.

RICHARD E. MOORE, *Primary Examiner.*

ROBERT L. WOLFE, *Assistant Examiner.*

U.S. Cl. X.R.

70—168, 165, 232